United States Patent [19]

Nagashima

[11] Patent Number: 5,444,761
[45] Date of Patent: Aug. 22, 1995

[54] ON-VEHICLE MOBILE RADIO TELEPHONE WITH AN ANSWERING FUNCTION

[75] Inventor: Akira Nagashima, Kawagoe, Japan

[73] Assignee: Pioneer Electronic Corporation, Tokyo, Japan

[21] Appl. No.: 825,067

[22] Filed: Jan. 24, 1992

[30] Foreign Application Priority Data

Jul. 1, 1991 [JP] Japan ................... 3-160649

[51] Int. Cl.$^6$ ............. H04M 11/00; H04M 1/64; H04Q 3/02; H04B 1/06
[52] U.S. Cl. ........................... 379/58; 379/59; 379/67; 379/88; 455/38.3; 455/345
[58] Field of Search ............ 379/58, 59, 67, 88; 455/343, 345, 38.3

[56] References Cited

U.S. PATENT DOCUMENTS

| | | | |
|---|---|---|---|
| 4,852,147 | 7/1989 | Suzuki et al. | 455/343 |
| 4,875,229 | 10/1989 | Palett et al. | 379/58 |
| 4,893,348 | 1/1990 | Andoh | 455/343 |
| 4,916,729 | 4/1990 | Usui | 379/58 |
| 5,058,150 | 10/1991 | Kang | 379/58 |
| 5,063,589 | 11/1991 | Tsushima | 379/67 |
| 5,081,668 | 1/1992 | Ito | 379/58 |
| 5,212,836 | 5/1993 | Matsushita | 455/343 |
| 5,241,582 | 8/1993 | Park | 379/58 |
| 5,247,564 | 9/1993 | Zicker | 379/59 |

Primary Examiner—Stephen Chin
Assistant Examiner—Vijay Shankar
Attorney, Agent, or Firm—Fish & Richardson

[57] ABSTRACT

An on-vehicle mobile radio telephone with an answering function, has the capability to automatically change the phone mode to an answer mode even if an occupant forgets to set an answer mode switch when leaving a vehicle not shift from phone mode to the answer mode while the vehicle is in motion. The on-vehicle mobile radio telephone with an answering function includes a message recording device; a handset; a channel for relaying a call signal to the handset; a call detecting device for detecting a call through the channel to generate a call detect signal; and a control device for executing an automatic reception mode to connect the channel to the message recording device according to the call detect signal with an answer mode designated. The control device includes an accessory switch (ACC) detecting device for detecting whether an accessory switch of a vehicle is on or off, whereby the automatic reception mode is initiated when the accessory switch (ACC) detecting device detects that the accessory switch is off.

2 Claims, 2 Drawing Sheets

ON-VEHICLE MOBILE RADIO TELEPHONE
WITH AN ANSWERING FUNCTION

BACKGROUND OF THE INVENTION

1. Field of the Invention

The present invention relates to a mobile radio telephone with an answering function adapted for installation in a motor vehicle.

2. Description of the Related Art

A telephone with an answering function or mode which automatically records the message of a caller on a recording medium like a cassette tape or an endless tape when nobody is available to answer the telephone. Telephones of this type have an answer mode switch. When this switch is on, the phone mode is changed to the answering mode when receiving a call, and when the switch is off, the phone mode is set to a normal phone mode.

Meanwhile, when a telephone with an answering function is installed in a motor vehicle, if the occupant forgets to change the phone mode to the answer mode when leaving the vehicle, a conventional telephone cannot provide the desired answering service when no one is in the vehicle. As a possible countermeasure to this problem, a method which automatically shifts the phone mode to the answer mode if nobody answers a call after a given number of ringings. This method, however, involves another problem that when the driver is the only occupant in a vehicle and cannot answer a call within a predetermined number of ringings during driving, the answering system will change the phone mode to the answer mode although the vehicle is occupied.

SUMMARY OF THE INVENTION

It is therefore an object of the present invention to provide an on-vehicle mobile radio telephone with an answering function, which can automatically change the phone mode to an answer mode even if an occupant forgets to set an answer mode switch on when leaving the vehicle and will not shift the phone mode to the answer mode when the vehicle is in use.

An on-vehicle mobile radio telephone with an answering function according to the present invention comprises a message recording means; a handset; a channel for relaying a call signal to the handset; a call detecting means for detecting a call through the channel to generate a call detect signal; and a control means for executing an automatic reception mode to connect the channel to the message recording means in response to the call detect signal with an answer mode designated the control means includes an accessory switch (ACC) detecting means for detecting whether an accessory switch of a vehicle is on or off, whereby the automatic reception mode is initiated when the accessory switch detecting means detects that the accessory switch is off.

The on-vehicle mobile radio telephone with an answering function according to the present invention detects whether the accessory switch of the vehicle is on or off, and automatically shifts the phone mode to the answer mode when detecting that the switch is off or the ignition key of the vehicle is removed.

DETAILED DESCRIPTION OF THE INVENTION

Figure 1:
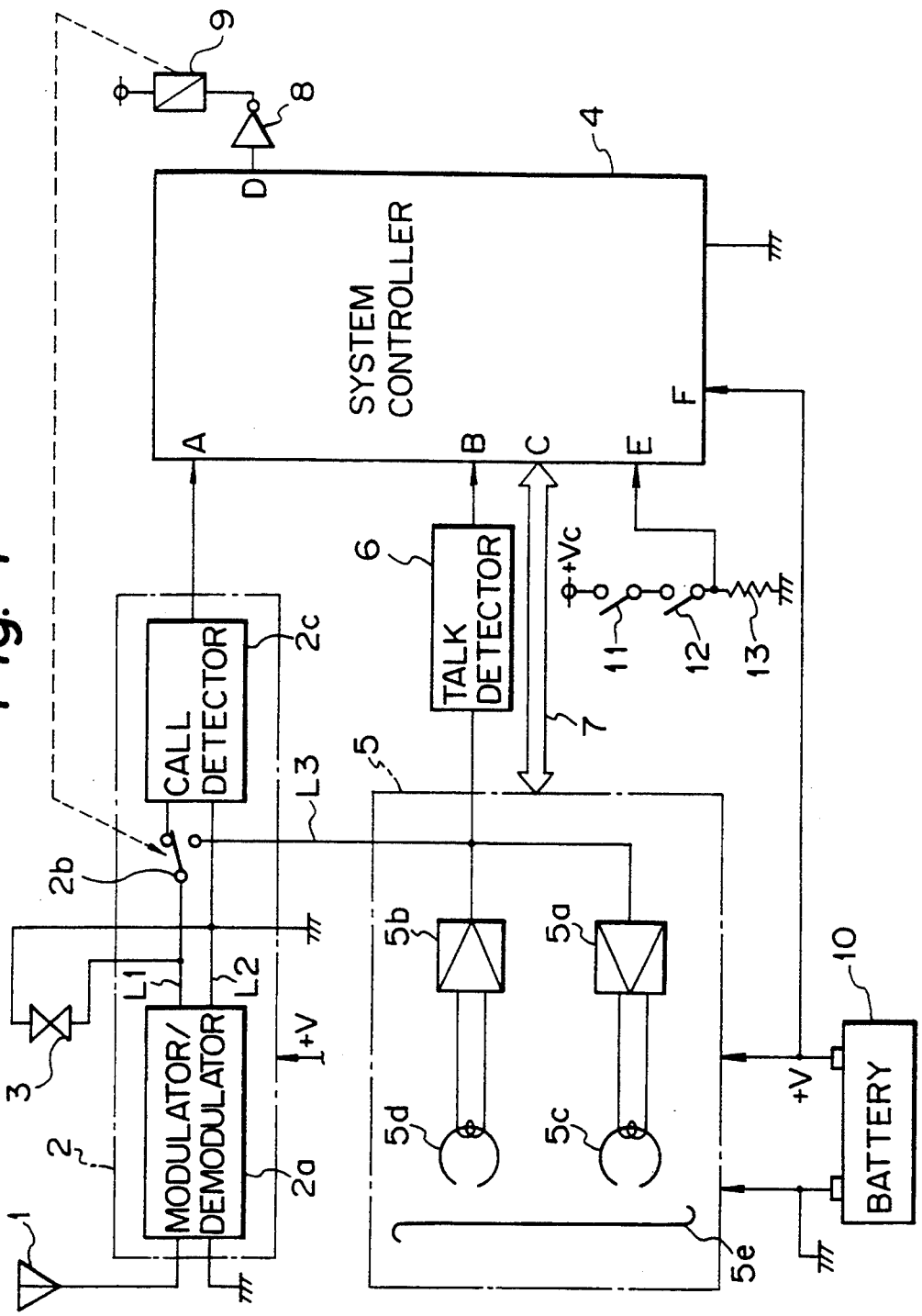
FIG. 1 is a block diagram illustrating an on-vehicle mobile radio telephone with an answering function according to the present invention.

A preferred embodiment of the present invention will now be described referring to FIGS. 1 and 2. FIG. 1 illustrates a structure of an on-vehicle mobile radio telephone with an answering function which is to be mounted on a motor vehicle. An antenna 1 is connected to a modulator/demodulator 2a of a receiving/transmitting section 2. The modulator/demodulator 2a is connected to channels L1 and L2, which are connected to a telephone 3 i.e. a handset. The channel L1 is also connected to an movable contact of a line switch 2b. One of fixed contacts of the switch 2b is connected together with the channel L2 to a call detector 2c as a call detecting means. The channel L2 serves as a common signal terminal GND in this telephone. The output terminal of the call detector 2c is connected to an input terminal A of a system controller 4 as a control means. The other fixed contact of the line switch 2b is connected through a channel L3 to a message recording means 5 and a talk detector 6. The talk detector 6 sends a talk detecting signal to an input terminal B of the system controller 4.

In the message recording means 5, the channel L3 is connected to the input terminal of a recording amplifier 5a and the output terminal of a playback amplifier 5b. A recording head 5c and a reproducing head 5d are connected respectively to the output terminal of the recording amplifier 5a and the input terminal of the playback amplifier 5b to ensure message recording and playback by means of a tape 5e. The message recording means 5 has drive sections such as a tape drive mechanism section and a servo circuit (both not shown), which are connected through a bus line 7 to an input/output terminal C of the system controller 4. An output terminal D of the system controller 4 is connected to the input terminal of a relay driver 8. In accordance with an instruction signal from the system controller 4, a relay coil 9 is energized to change the line switch 2b. With the relay coil 9 energized, the input terminal of the line switch 2b is shifted from the side of the call detector 2c to the side of the message recording means 5.

A mode switch 11 is a switch to set an automatic answer mode when rendered off. An accessory switch (ACC) 12 is to be set off when an ignition key for the vehicle is removed from the key receiving lore around the steering. The mode switch 11 has one terminal connected to a power supply +Vc, and the other terminal connected to one terminal of the accessory switch 12. The other terminal of the accessory switch 12 is pulled down by a resistor 13, and is connected to an input terminal E of the system controller 4. When both switches 11 and 12 are on, the input terminal E becomes high. When both or one of the switches 11 and 12 is turned off, the input terminal E becomes low. A battery 10 supplies power (+V) to the above-described components.

Figure 2:
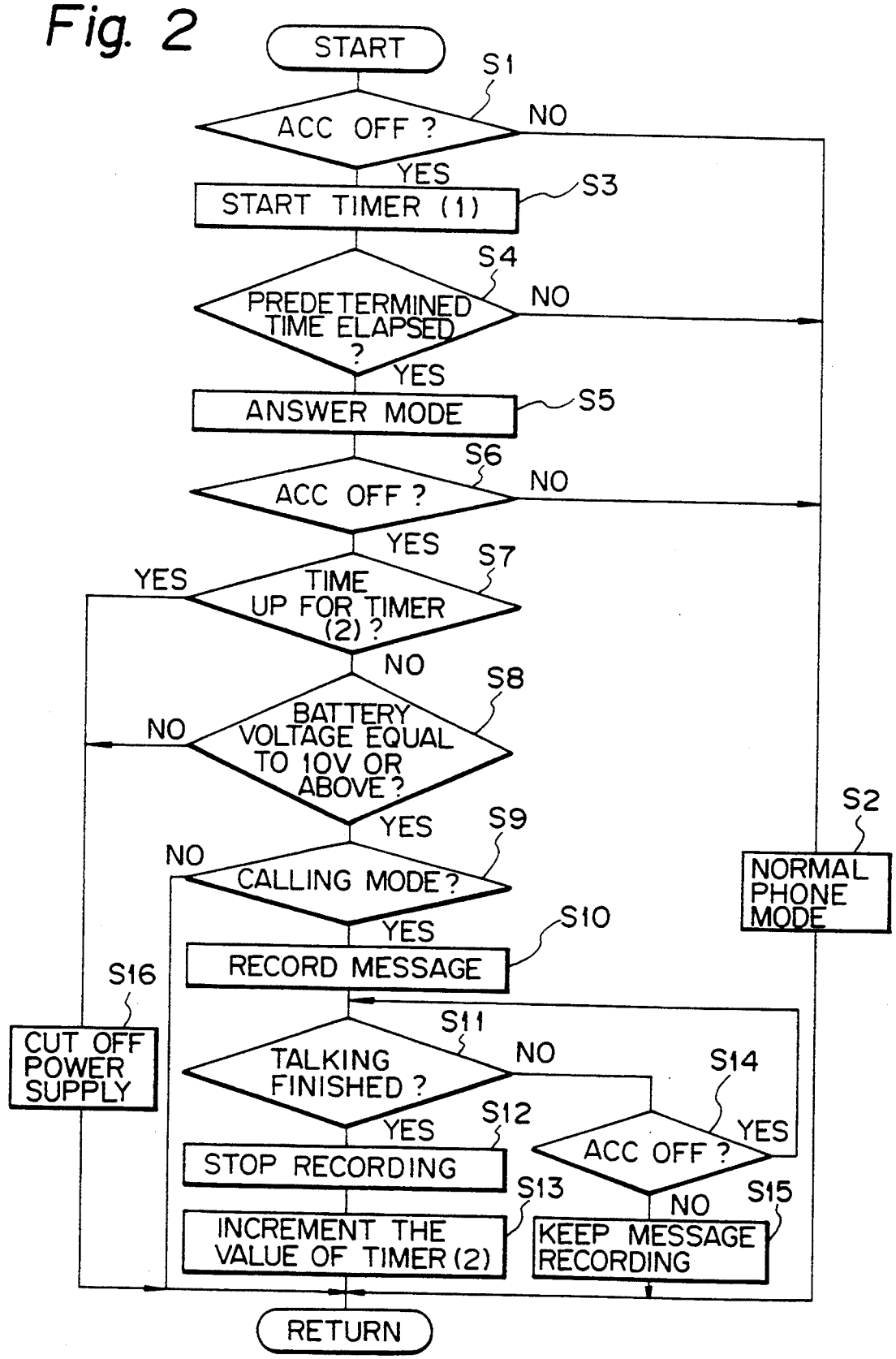
FIG. 2 is a flowchart showing the operation executed by a system controller 4 in FIG. 1.

The operation of the telephone shown in FIG. 1 will now be explained referring to FIG. 2 illustrating a flowchart of a subroutine governing the answer mode which the system controller 4 will execute in that mode. The antenna 1 receives a modulated carrier signal or a ringing sound from an exchanger (not shown), which is modulated by a call signal in response to a call arrived at the exchanger. The received modulated carrier signal is demodulated by the modulator/demodulator 2a, and a call signal is sent to the channel L1. The call signal is supplied through the line switch 2b to the call detector 2c, so that a call detect signal is in turn supplied to the input terminal A of the system controller 4. The system controller 4 initiates execution of the subroutine for the answer mode as needed by an interrupt process or the like in the main routine (not shown), and determines whether or not the mode switch 11 and the accessory switch 12 are off, i.e., open (step S1). This determination depends on the level of the input terminal E. When the input terminal E is determined to have a high level, the system controller 4 sets the reception mode to a normal phone mode, or checks that the normal phone mode has already been set (step S2). The operation then returns to the main routine. In the normal phone mode, no instruction signal is sent from the output terminal D of the system controller 4, and the output terminal of the line switch 2b remains connected to the call detector 2c. In this case, an occupant can make a call in a vehicle, so that lifting of the handset 3 will provide a channel between a caller and a telephone, permitting the occupant to talk to the caller. In other words, the system controller 4 does not intervene in the communication between the caller and the receiver including the line connection to the exchanger in the normal phone mode.

If the occupant forgets to set the telephone to the answer mode before leaving the vehicle, the mode switch 11 is in an "off" state. Since the occupant removes the key of the vehicle from the keyhole, the accessory switch (ACC) 12 is rendered off. Thus, the input terminal E of the system controller 4 becomes low. The flow moves from step S1 to step S3, where the system controller 4 starts a timer (1) and determines if a predetermined time has elapsed (step S4). When the system controller 4 determines that the predetermined time has elapsed, the system controller 4 sets the reception mode to the answer mode (step S5). This delay time allows the occupant of the vehicle to answer a call before leaving the vehicle although he has already removed the key from the keyhole. Therefore, the phone mode is changed to the answer mode after a delay of about ten seconds following the setting of the accessory switch (ACC) 12 to off.

The system controller 4 determines again if the accessory switch (ACC) 12 is off (step S6). If the accessory switch (ACC) 12 is judged to be off, the number of recorded messages is determined by whether a timer (2) shows a full count (step S7). If a 60-minute magnetic tape is used with each message recording time set to as long as three minutes, for example, the timer (2) indicates 20 as a full count. When the system controller 4 does not judge in step S7 that the timer (2) has reached the full count, the controller 4 determines whether or not the voltage of the battery 10 is 10 V or higher (step S8). If it is judged in step S6 that the accessory switch (ACC) 12 is on, i.e., that the key of the vehicle has been inserted into the keyhole again, the flow returns to step S2 to set the reception mode to the normal phone mode, returning to the main routine. When the determination is made in step S7 that a time-over has occurred, and when it is determined in step S8 that the voltage of the battery 10 is less than 10 V, power supply to the circuitry excluding the system controller 4 is forcibly stopped to save the battery 10.

If it is Judged in step S8 that the voltage of the battery 10 is 10 V or above, the system controller 4 moves to step S9 and determines whether the call detect signal is received from the exchanger (not shown) of a telephone company. When the call detect signal is sent to the input terminal A of the system controller 4, the controller 4 executes the message recording operation (step S10). In the message recording operation, an instruction signal is sent from the output terminal D of the system controller 4 to the relay driver 8 which drives the relay coil 9. The input terminal of the line switch 2b is then switched from the call detector 2c to the message recording means 5. The channel L1 is connected to the channel L3 by this switching action, so that a talk detecting signal is sent from the talk detector 6 to the input terminal B of the system controller 4. Upon reception of the talk detecting signal, the system controller 4 detects that talking to the caller is possible, and activates the message recording means 5 through the bus line 7 to be ready for recording the message. An outgoing message is then sent, explaining that the answering service is working and how to leave a message. To send out this message, message data as a digital signal previously stored in a speech synthesizing ROM (not shown) is read out, is converted into an analog message signal by an A/D converter (not shown), and is sent to the channel L3. The carrier signal of the message data is modulated by the modulator/demodulator 2a and the resultant signal is radiated from the antenna 1.

After sending the message, the system controller 4 supplies a record command to the message recording means 5 to record the message of the caller. The system controller 4 determines in step S11 based on the talk detecting signal whether talking is over. When it is determined that the talking is over, the system controller 4 stops recording (step S12), increments the timer (2) (step S13), and returns to the main routine. If the magnetic tape is of an endless type, it may be unnecessary to determine in step S7 if the timer (2) shows the full count. If it is judged in step S11 that the talking is still going on, the system controller 4 determines if the accessory switch (ACC) 12 is off (step S14). If the accessory switch (ACC) 12 is off, the system controller 4 returns to step S11 to continue recording of the message. If the accessory switch (ACC) 12 is not judged to be in an off state in step S14, i.e., when insertion of the key of the vehicle is detected, the system controller 4 returns to the main routine while keeping recording the message (step S15). The system controller 4 then determines whether or not the recording should continue in accordance with the operation instruction from the occupant.

The mode switch 11 is located in parallel to the accessory switch (ACC) 12 as shown in FIG. 1. Even if the key of the vehicle is inserted to render the accessory switch (ACC) 12 on, therefore, the reception mode can be forcibly set to the answer mode by turning off the mode switch 11. This setup is very convenient when the occupant cannot answer the phone, for example when driving on an expressway.

According to a second embodiment, when a transfer instruction signal is received from a caller, the system controller 4 supplies instructions to the message recording means to rewind the magnetic tape and to play back the tape, and sends recorded messages to the caller. The transfer instruction signal is, for example, a four-digit password number of a multiple frequency signal (DTMF) to be generated through push buttons of the sender. The message transfer is made upon detection of the password number by the talk detector 6.

As described above, even when an occupant forgets to set the reception mode to the answer mode before leaving a vehicle, the reception mode is automatically set to the answer mode as an automatic reception mode by the system controller 4 including the accessory switch (ACC) detecting means (in step S1 shown in FIG. 2) which detects the on/off state of the accessory switch (ACC) 12.

Although an on-vehicle mobile radio telephone with an answering function has been described in the foregoing description of both the first and second embodiments, the telephone with an answering function can also be used on other moving objects, such as ships.

When the timer (2) indicates the full count in step S7 in FIG. 2, the recorded message may be automatically transmitted to a specific answering telephone, for example, at home. This case does not require a large memory capacity for recording messages, so that an IC can be used as a message recording medium.

As described above, the telephone with an answering function according to the present invention detects whether the vehicular accessory switch is on or off. With the accessory switch in the off state indicating that the key of a vehicle has been removed from the keyhole of the vehicle, the reception mode is automatically shifted to the answer mode. Therefore, even if the occupant forgets to change the mode to the answer mode when leaving the vehicle, the telephone with the answering function automatically sets the phone to the answer mode, providing a convenient answering service.

What is claimed is:

1. An on-vehicle mobile radio telephone with an answering function comprising:
   a message recording means;
   a handset;
   a channel for relaying a call signal to the handset;
   a call detecting means for detecting a call through the channel to generate a call detect signal; and
   a control means for executing an automatic reception mode to connect the channel to the message recording means according to the call detect signal with an answer mode designated, said control means including an accessory switch (ACC) detecting means for detecting whether an accessory switch of a vehicle is on or off and means for performing said automatic reception mode when a predetermined time period has lapsed from when the accessory switch (ACC) detecting means detects that the accessory switch is off.

2. An on-vehicle mobile radio telephone according to claim 1, wherein said control means includes a voltage detecting means for detecting a voltage of a power supply to be supplied to the message recording means and means for ceasing the execution of said automatic reception mode when said voltage detecting means detects that the voltage is equal to or below a predetermined voltage.

* * * * *